US009938382B2

(12) United States Patent
Yamasaki et al.

(10) Patent No.: US 9,938,382 B2
(45) Date of Patent: *Apr. 10, 2018

(54) METHOD FOR PRODUCING PSEUDOPOLYROTAXANE

(75) Inventors: Tomoaki Yamasaki, Himeji (JP); Shinya Okazaki, Himeji (JP); Hiroki Okazaki, Himeji (JP); Shigeki Hamamoto, Himeji (JP); Changming Zhao, Kashiwa (JP)

(73) Assignees: Sumitomo Seika Chemicals Co., Ltd., Hyogo (JP); Advanced Softmaterials Inc., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/994,515

(22) PCT Filed: Dec. 5, 2011

(86) PCT No.: PCT/JP2011/078015
§ 371 (c)(1),
(2), (4) Date: Jul. 25, 2013

(87) PCT Pub. No.: WO2012/081429
PCT Pub. Date: Jun. 21, 2012

(65) Prior Publication Data
US 2013/0296546 A1 Nov. 7, 2013

(30) Foreign Application Priority Data
Dec. 16, 2010 (JP) .................... 2010-280264

(51) Int. Cl.
| C08G 83/00 | (2006.01) |
| C08J 3/12 | (2006.01) |
| C08B 37/16 | (2006.01) |
| C08L 5/16 | (2006.01) |
| C08L 71/02 | (2006.01) |

(52) U.S. Cl.
CPC ........ C08G 83/007 (2013.01); C08B 37/0015 (2013.01); C08J 3/12 (2013.01); C08L 5/16 (2013.01); C08L 71/02 (2013.01); C08J 2371/02 (2013.01)

(58) Field of Classification Search
CPC ....... C08G 83/007; C08J 3/12; C08J 2371/02; C08B 37/0015; C08L 5/16; C08L 71/02
USPC ...................................................... 536/103
See application file for complete search history.

(56) References Cited

U.S. PATENT DOCUMENTS

| 5,855,900 A | 1/1999 | Nobuhiko |
| 6,037,387 A | 3/2000 | Yui et al. |
| 6,100,329 A | 8/2000 | Gibson et al. |
| 6,828,378 B2 | 12/2004 | Okumura et al. |
| 9,475,908 B2* | 10/2016 | Yamasaki ........... C08B 37/0015 |
| 2001/0033868 A1 | 10/2001 | Rossling et al. |
| 2005/0101624 A1 | 5/2005 | Betts et al. |
| 2005/0123614 A1 | 6/2005 | Kim et al. |
| 2006/0069168 A1 | 3/2006 | Tabata et al. |
| 2008/0003296 A1* | 1/2008 | Ketner ................. A61K 9/2031 424/499 |
| 2008/0097039 A1 | 4/2008 | Ito et al. |
| 2009/0088546 A1* | 4/2009 | Ito et al. ....................... 527/300 |
| 2009/0131588 A1 | 5/2009 | Ito et al. |
| 2009/0312490 A1 | 12/2009 | Ito et al. |
| 2009/0312491 A1 | 12/2009 | Ito et al. |
| 2010/0274002 A1 | 10/2010 | Amann et al. |
| 2013/0296547 A1 | 11/2013 | Yamasaki et al. |
| 2013/0317209 A1 | 11/2013 | Yamasaki et al. |
| 2013/0331562 A1 | 12/2013 | Yamasaki et al. |
| 2014/0066615 A1 | 3/2014 | Yamasaki et al. |
| 2014/0066616 A1 | 3/2014 | Yamasaki et al. |

FOREIGN PATENT DOCUMENTS

| CN | 1426424 | 6/2003 |
| CN | 1910218 | 2/2007 |
| CN | 1938367 | 3/2007 |
| EP | 1 921 105 | 5/2008 |
| EP | 1 942 163 | 7/2008 |
| EP | 2 653 482 | 10/2013 |
| JP | 03-237103 | 10/1991 |

(Continued)

OTHER PUBLICATIONS

Topchieva et al. Two-Phase Channel Structures Based on a-Cyclodextrin-Polyethylene Glycol Inclusion Complexes. Langmuir 20:9036, 9043, 2004.*
Hedges AR. Industrial Applications of Cyclodextrins. Chem Rev 98:2035-2044, 1998.*
Fleury et al. Synthesis and characterization of high molecular weight polyrotaxanes:towards the control over a wide range of threaded a-cyclodextrins. Soft Matter, 2005, 1, 378-385.*
"Kagaku Daijiten 2", Kyoritsu Shuppan Co., Ltd., 1993, Pocket Edition, 34$^{th}$ Impression, pp. 658-659, with partial translation.

(Continued)

Primary Examiner — Yih-Horng Shiao
(74) Attorney, Agent, or Firm — Hamre, Schumann, Mueller & Larson, P.C.

(57) ABSTRACT

The present invention aims to provide an industrially advantageous method of producing a powdery pseudopolyrotaxane with a high inclusion ratio. The present invention relates to a method for producing a pseudopolyrotaxane, including: an inclusion step of mixing a polyethylene glycol and a cyclodextrin in an aqueous medium to form an aqueous dispersion of pseudopolyrotaxane that contains pseudopolyrotaxane particles in which the polyethylene glycol is included in the cavities of the cyclodextrin molecules in a skewered manner; and a drying step of drying the aqueous dispersion of pseudopolyrotaxane produced in the inclusion step to obtain the pseudopolyrotaxane. In the drying step, the aqueous dispersion of pseudopolyrotaxane is sprayed and dried in a heated gas-stream.

7 Claims, No Drawings

(56) References Cited

FOREIGN PATENT DOCUMENTS

| JP | 2002-508401 | 3/2002 |
|---|---|---|
| JP | 2005-154675 | 6/2005 |
| JP | 2005-272664 | 10/2005 |
| JP | 2006-316089 | 11/2006 |
| JP | 2007-063412 | 3/2007 |
| JP | 2007-092024 | 4/2007 |
| JP | 2008-310286 | 12/2008 |
| WO | 99/30744 | 6/1999 |
| WO | WO 2005/080469 | 9/2005 |

OTHER PUBLICATIONS

"Kagaku Daijiten 8", Kyoritsu Shuppan Co., Ltd., 1987, Pocket Edition, $30^{th}$ Impression, pp. 214-215, with partial translation.

Guo, et al., "Spray Drying (1st Edition)", pp. 191, 193-195, 1983 with a full English translation.

Guo, et al., "Spray Drying ($1^{st}$ edition)", pp. 1-6, 1983 with a full English translation.

Liu et al., "Solvent-Free Synthesis of Unmodified Cyclodextrin-Based Pseudopolyrotaxane and Polyrotaxane by Grinding", Polymer Journal, vol. 39, No. 1, Jan. 15, 2007, pp. 21-23.

Fleury et al., "Synthesis and characterization of high molecular weight polyrotaxanes: towards the control over a wide range of threaded α-cyclodedextrins", Soft Matter, vol. 1, No. 5, Jan. 1, 2005, pp. 378-385.

Lavett, et al., "Vacuum Drying", The Journal of Industrial and Engineering Chemistry, vol. 13, No. 7, pp. 600-605, Jul. 1921.

Form PTO-892 issued in co-pending U.S. Appl. No. 14/004,849 dated Sep. 21, 2015 (1 page).

Pan, et al., "Modern Drying Technology, the 1st Edition", Chemical Industry Press, Sep. 30, 1998, line 1 on p. 121 to line 8 on p. 122—with a full translation.

* cited by examiner

METHOD FOR PRODUCING PSEUDOPOLYROTAXANE

TECHNICAL FIELD

The present invention relates to a method for producing a pseudopolyrotaxane.

BACKGROUND ART

Crosslinked polyrotaxanes are produced by crosslinking polyrotaxanes in which a capping group is introduced at each end of a pseudopolyrotaxane. In the case that a pseudopolyrotaxane is formed from a polyethylene glycol (hereinafter, also referred to as a "PEG") and a cyclodextrin that includes the PEG, for example, the resultant crosslinked polyrotaxane has a structure in which linear molecules of the PEG thread through cyclodextrin molecules in a skewered manner and the cyclodextrin molecules are movable along the linear molecules (has a pulley effect). The pulley effect allows the crosslinked polyrotaxane to uniformly distribute tensile force applied thereto. The crosslinked polyrotaxane is therefore not likely to have cracks or flaws, i.e., has excellent characteristics that conventional crosslinked polymers do not have.

The pseudopolyrotaxanes used for production of crosslinked polyrotaxanes are generally produced by mixing a PEG and a cyclodextrin in an aqueous medium. Accordingly, the resultant pseudopolyrotaxanes are obtained in the form of an aqueous dispersion. Efficient formation of a polyrotaxane by introduction of a capping group to each end of a pseudopolyrotaxane with a chemically stable bond can be achieved by a reaction between a PEG with a —COOH group at each end and a capping group reactive with the —COOH group, such as a —NH$_2$ group or a —OH group.

This reaction of introducing a capping group to each end of a pseudopolyrotaxane, however, is deactivated by moisture in the system. Thus, the reaction requires the absence of water in the reaction system, or the water content controlled to an extremely slight amount, for efficient proceeding thereof. In other words, the aqueous dispersion of pseudopolyrotaxane requires sufficient elimination of water by drying the aqueous dispersion after solid-liquid separation by, for example, centrifugation or filtration, or drying without such separation.

Patent Literature 1 discloses that suspension of a precipitate of a PEG/α-cyclodextrin inclusion compound (pseudopolyrotaxane) in water and heating of the suspension to 70° C. or higher lead to a decrease in the inclusion ability and release of cyclodextrin molecules. Therefore, drying the aqueous dispersion of pseudopolyrotaxane at 70° C. or higher may cause a decrease in the inclusion ratio. The decrease in the inclusion ratio deteriorates the pulley effect of the crosslinked polyrotaxane, whereby the desired properties are not achieved. Accordingly, aqueous dispersions of pseudopolyrotaxane have been mainly freeze-dried or dried under decreased pressure at 70° C. or lower.

For example, Patent Literature 2 discloses a method in which an aqueous dispersion of pseudopolyrotaxane added in acetone, and the pseudopolyrotaxane is precipitated and then filtered, and the resultant product is vacuum dried at room temperature. However, the moisture in the pseudopolyrotaxane cannot be sufficiently eliminated by replacing the medium with acetone and filtering. Accordingly, drying at room temperature cannot completely eliminate the moisture, and residual moisture inhibits the reaction of introducing a capping group at each end of the pseudopolyrotaxane.

Moreover, conventional drying methods such as freeze-drying and vacuum drying at 70° C. or lower cause the resulting pseudopolyrotaxane to agglomerate. Therefore, powdering steps such as pulverization and classification are required before the reaction of introducing a capping group at each end, complicating the production process.

CITATION LIST

Patent Literature

Patent Literature 1: JP 3-237103 A (Japanese Kokai Publication No Hei-3-237103)
Patent Literature 2: JP 2005-272664 A (Japanese Kokai Publication No 2005-272664)

SUMMARY OF INVENTION

Technical Problem

Conventional drying methods are performed at a temperature equal to or lower than the boiling point of water that is the dispersing medium. Therefore, it requires not only an extremely long drying time but also, in the case of the freeze-drying method, costs for preparing and running large equipment.

Another problem is that even a heating temperature of 70° C. or lower causes a pseudopolyrotaxane to release cyclodextrin when it contains moisture and is dried for a long time.

Furthermore, a drying method is desired which provides a powdery pseudopolyrotaxane without any complicated steps such as pulverization and classification after drying.

The present invention aims to provide an industrially advantageous method of producing a powdery pseudopolyrotaxane with a high inclusion ratio and solves the above problems.

Solution to Problem

The present invention relates to a method for producing a pseudopolyrotaxane, including: an inclusion step of mixing a PEG and a cyclodextrin in an aqueous medium to form an aqueous dispersion of pseudopolyrotaxane that contains pseudopolyrotaxane particles in which the PEG is included in the cavities of the cyclodextrin molecules in a skewered manner; and a drying step of drying the aqueous dispersion of pseudopolyrotaxane produced in the inclusion step to obtain the pseudopolyrotaxane. In the drying step, the aqueous dispersion of pseudopolyrotaxane is sprayed and dried in a heated gas-stream.

The present invention is described in detail below.

The present inventors have found that spray-drying the aqueous dispersion of pseudopolyrotaxane in a heated gas-stream in the drying step enables industrially advantageous production of a powdery pseudopolyrotaxane with a high inclusion ratio, thereby completing the present invention.

The method for producing a pseudopolyrotaxane of the present invention includes an inclusion step of mixing a PEG and a cyclodextrin in an aqueous medium to form an aqueous dispersion of pseudopolyrotaxane that contains pseudopolyrotaxane particles in which the PEG is included in the cavities of the cyclodextrin molecules in a skewered manner.

The PEG preferably has a weight average molecular weight of 1,000 to 500,000, more preferably 10,000 to 300,000, and still more preferably 10,000 to 100,000. A weight average molecular weight of the PEG of less than 1,000 may result in poor characteristics of a crosslinked polyrotaxane. A weight average molecular weight of the PEG of more than 500,000 may cause the aqueous dispersion of pseudopolyrotaxane to have low fluidity, which makes it difficult to spray the aqueous dispersion of pseudopolyrotaxane in the drying step.

The weight average molecular weight herein is a polyethylene glycol equivalent value calculated through measurement by gel permeation chromatography (GPC). A column used for determination of a polyethylene glycol equivalent weight average molecular weight by GPC is, for example, TSKgel SuperAWM-H (product of TOSOH CORPORATION).

The PEG preferably has a reactive group at each end of the linear molecule. The reactive group can be introduced at each end of the linear molecule by a conventionally known method.

The reactive group introduced at each end of the linear molecule can be appropriately changed depending on the capping group to be used. Examples of the reactive group include, but not particularly limited to, hydroxyl, amino, carboxyl, and thiol groups. Carboxyl group is particularly preferred. Examples of the method for introducing a carboxyl group at each end of the linear molecule include a method of oxidizing each end of the linear molecule using TEMPO (2,2,6,6-tetramethyl-1-piperidinyloxy radicals) and sodium hypochlorite.

In the inclusion step, the weight ratio between the PEG and the cyclodextrin is preferably 1:2 to 1:5, more preferably 1:2.5 to 1:4.5, and still more preferably 1:3 to 1:4. A weight of the cyclodextrin of less than twice the weight of the PEG may decrease the number (i.e., inclusion amount) of cyclodextrin molecules including the PEG. A weight of the cyclodextrin of more than five times the weight of the PEG may not increase the inclusion amount further, and thus is not economical.

Examples of the cyclodextrin include α-cyclodextrin, β-cyclodextrin, γ-cyclodextrin, and derivatives of these cyclodextrins. Particularly in terms of inclusion property, α-cyclodextrin is preferred. These cyclodextrins may be used alone or in combination.

Examples of the aqueous medium include water, and aqueous mixtures of water and an aqueous organic solvent such as DMF and DMSO. Particularly, water is preferred.

The only required condition for mixing the PEG and the cyclodextrin in the inclusion step is mixing them in the above aqueous medium. Preferably, the PEG and the cyclodextrin are dissolved in the aqueous medium. Specifically, the PEG and the cyclodextrin are added to the aqueous medium and this pre-mixture is typically heated to 50° C. to 100° C., preferably 60° C. to 90° C., and more preferably 70° C. to 80° C., so that the components are dissolved in the aqueous medium. This provides a substantially transparent mixed solution.

Cooling the resulting mixed solution of the PEG and the cyclodextrin precipitates pseudopolyrotaxane particles of the PEG and the cyclodextrin, resulting in a basically white aqueous dispersion of pseudopolyrotaxane.

If the mixed solution is continuously or intermittently cooled while being flowed so that pseudopolyrotaxane particles are precipitated, the resulting aqueous dispersion of pseudopolyrotaxane has good fluidity, and does not cause a decrease in fluidity with time. Accordingly, the aqueous dispersion of pseudopolyrotaxane can be easily sprayed in the drying step.

If the mixed solution is cooled while being left to stand for precipitation of pseudopolyrotaxane particles, the resulting aqueous dispersion of pseudopolyrotaxane is turned into the form of paste or cream which has very low fluidity, or into the form of gel which has no fluidity.

Since an aqueous dispersion of pseudopolyrotaxane turned into the form of paste or cream also loses its fluidity with time, such an aqueous dispersion is preferably stirred and mixed under suitable conditions so as to be fluid before spray-drying in the drying step.

The mixed solution is preferably cooled to an end-point temperature of 0 to 30° C., more preferably 1 to 20° C., and still more preferably 1 to 15° C. An end-point temperature of the mixed solution of lower than 0° C. may freeze the aqueous dispersion of pseudopolyrotaxane to decrease the fluidity. An end-point temperature of the mixed solution of higher than 30° C. may not sufficiently precipitate pseudopolyrotaxane particles.

The mixed solution is preferably cooled at a cooling speed of 0.01 to 30° C./min, more preferably 0.05 to 20° C./min, and still more preferably 0.05 to 10° C./min. A cooling speed in cooling the mixed solution of lower than 0.01° C./rain may precipitate very fine pseudopolyrotaxane particles, resulting in a decrease in fluidity of the resulting aqueous dispersion of pseudopolyrotaxane. A cooling speed in cooling the mixed solution of higher than 30° C./min may produce large pseudopolyrotaxane particles which decrease the distribution stability of the resulting aqueous dispersion of pseudopolyrotaxane, leading to sedimentation.

For more thorough precipitation of pseudopolyrotaxane particles, intermittent cooling is also possible as described above. Also, the cooling speed or the flowing state of the mixed solution can be changed during the cooling.

The time for retaining the flowing state of the resulting aqueous dispersion of pseudopolyrotaxane after the mixed solution is cooled to a desired temperature is typically several seconds to one week, and preferably several hours to three days.

The method of flowing the mixed solution while cooling the mixed solution may be a known method such as stirring with stirring blades or ultrasonic irradiation.

The degree of flowing the mixed solution is not particularly limited, and may be optionally selected from the range of slight flowing of the mixed solution caused by gentle stirring to strong flowing caused by vigorous stirring using a homogenizer. Excessively weak flowing may precipitate large pseudopolyrotaxane particles, which decreases the distribution stability of the resulting aqueous dispersion of pseudopolyrotaxane, likely leading to sedimentation. In contrast, excessively strong flowing may precipitate very fine pseudopolyrotaxane particles, likely leading to decreased fluidity of the resultant aqueous dispersion of pseudopolyrotaxane.

If the mixed solution is cooled without being flowed, an aqueous dispersion of pseudopolyrotaxane is turned into the form of gel which has very low fluidity or no fluidity.

The volume average particle size of the particles in the aqueous dispersion of pseudopolyrotaxane varies depending on the cooling speed, the end-point temperature after the cooling, and the flowing state of the mixed solution during the cooling. The volume average particle size is preferably 1 to 200 μm, more preferably 1 to 100 μm, and still more preferably 1 to 50 μm, in terms of the fluidity and the distribution stability of the aqueous dispersion of pseudopolyrotaxane. If the volume average particle size of the particles in the aqueous dispersion of pseudopolyrotaxane is less than 1 μm, the dispersion may show decreased fluidity or no fluidity. If the volume average particle size of the particles in the aqueous dispersion of pseudopolyrotaxane is more than 200 µm, the particles in the aqueous dispersion of pseudopolyrotaxane may be sedimented.

The volume average particle size of the particles in the aqueous dispersion of pseudopolyrotaxane herein can be analyzed using a laser diffraction particle size analyzer.

The pseudopolyrotaxane concentration of the aqueous dispersion of pseudopolyrotaxane (hereinafter, also referred to as a "solids concentration") is preferably 5 to 25% by weight, more preferably 5 to 20% by weight, and still more preferably 10 to 20% by weight. A solids concentration of the aqueous dispersion of pseudopolyrotaxane of lower than 5% by weight is not economical. A solids concentration of the aqueous dispersion of pseudopolyrotaxane of higher than 25% by weight may decrease the fluidity of the aqueous dispersion of pseudopolyrotaxane, causing difficulty in spraying of the dispersion in a heated stream in the drying step.

The method for producing a pseudopolyrotaxane of the present invention includes a drying step of drying the aqueous dispersion of pseudopolyrotaxane produced in the inclusion step to obtain a pseudopolyrotaxane. The method for producing a pseudopolyrotaxane of the present invention can provide a powdery pseudopolyrotaxane through this drying step.

In the drying step, the aqueous dispersion of pseudopolyrotaxane is sprayed and dried in a heated gas-stream.

Examples of the method for spray-drying the aqueous dispersion of pseudopolyrotaxane include a nozzle method using a nozzle such as a pressure nozzle, a two-fluid nozzle, a four-fluid nozzle, or an ultrasonic nozzle, and a rotating disk method.

The nozzle method can be suitably used in the case that the aqueous dispersion of pseudopolyrotaxane has high fluidity.

Examples of the device usable for the nozzle method include a nozzle atomizer spray dryer. The method employed in those nozzle atomizer spray dryers is roughly classified into counter spraying of spraying the aqueous dispersion of pseudopolyrotaxane against the hot-gas blowing direction, and parallel spraying of spraying the aqueous dispersion of pseudopolyrotaxane in the same direction as the hot-gas blowing direction. The counter spraying leads to long residence time of the sprayed aqueous dispersion of pseudopolyrotaxane, while the parallel spraying leads to short residence time of the sprayed aqueous dispersion of pseudopolyrotaxane. With such a nozzle atomizer spray dryer, changing the nozzle size to adjust the size of drops to be sprayed allows adjustment of the particle size of the resulting pseudopolyrotaxane to a desired size.

The rotating disc method can be suitably used in the case that the aqueous dispersion of pseudopolyrotaxane has low fluidity, or the pseudopolyrotaxane in the aqueous dispersion of pseudopolyrotaxane has a relatively large particle size.

Examples of the device used for the rotating disc method include a rotary atomizer spray dryer. With such a rotary atomizer spray dryer, changing the number of rotations of the disc to adjust the size of drops to be sprayed allows adjustment of the particle size of the resulting powdery pseudopolyrotaxane to a desired size.

In the drying step, the gas-stream may include a gas such as air or nitrogen.

The temperature of the gas-stream in the drying step is preferably 70 to 200° C., more preferably 70 to 180° C., and still more preferably 70 to 170° C. If the temperature of the gas-stream is lower than 70° C., the drying may be insufficient. If the temperature of the gas-stream is higher than 200° C., the pseudopolyrotaxane is decomposed, possibly resulting in a reduction in the inclusion ratio.

The pressure in the system in the drying step is not particularly limited, but is typically a pressure near the atmospheric pressure. Drying under a reduced pressure is also possible, and drying under a pressure equal to or lower than the atmospheric pressure is preferred.

The residence time of the sprayed aqueous dispersion of pseudopolyrotaxane is typically several seconds to several minutes. For suppression of release of cyclodextrin molecules, it is preferably three minutes or shorter, and more preferably two minutes or shorter. Too short a residence time of the sprayed aqueous dispersion of pseudopolyrotaxane leads to insufficient drying.

The diameter of the drops of the aqueous dispersion of pseudopolyrotaxane to be sprayed is preferably 1 to 2,000 µm and more preferably 5 to 500 µm. A diameter of the drops of smaller than 1 µm may cause the drops to be blown together with the gas, decreasing the drying yield. A diameter of the drops of larger than 2,000 µm may lead to a small total area of the whole drops, decreasing the drying speed.

The inclusion ratio of the resulting powdery pseudopolyrotaxane can be 6 to 60% in the present invention, although it depends on the use and purpose of the resulting powdery pseudopolyrotaxane and crosslinked polyrotaxane. An inclusion ratio of lower than 6% may not give a pulley effect to the resulting crosslinked polyrotaxane. An inclusion ratio of higher than 60% may result in too dense arrangement of cyclodextrin molecules, which are cyclic molecules, so that the mobility of the cyclodextrin molecules decreases. In order to give appropriate mobility to the cyclodextrin molecules and still achieve an inclusion ratio as high as possible, the inclusion ratio is preferably 15 to 40%, and more preferably 20 to 30%.

The inclusion ratio herein refers to a ratio of the inclusion amount of the cyclodextrin molecules including a PEG to the maximum inclusion amount of cyclodextrin molecules for a PEG. The inclusion ratio is optionally controllable by changing the mixing ratio of the PEG to the cyclodextrin or the kind of aqueous medium. The maximum inclusion amount refers to the number of cyclodextrin molecules in the case of the close-packed inclusion state in which one cyclodextrin molecule includes two repeating units of the PEG.

The inclusion ratio can be measured by $^1$H-NMR. If the measurement is performed in the state where the resulting powdery pseudopolyrotaxane is dissolved, cyclodextrin molecules are released, preventing measurement of a correct inclusion ratio. Accordingly, the measurement is typically performed in the state where a pseudopolyrotaxane is modified to a polyrotaxane in which a capping group is introduced at each end of the pseudopolyrotaxane so as not to have the cyclodextrin molecules be released. Thus obtained inclusion ratio can be regarded as the inclusion ratio of the powdery pseudopolyrotaxane. Specifically, the inclusion ratio can be calculated by dissolving an obtained polyrotaxane in DMSO-$d_6$, subjecting the solution to measurement using an NMR measuring device (VARIAN Mercury-400BB), and comparing the integrated value of cyclodextrin peak at 4 to 6 ppm and the integrated value of cyclodextrin peak and the PEG peak at 3 to 4 ppm.

The volume average particle size of the powdery pseudopolyrotaxane to be obtained by the method for producing a pseudopolyrotaxane in the present invention is preferably 1 to 300 µm, more preferably 5 to 70 µm, and still more preferably 5 to 50 µm. A volume average particle size of a powdery pseudopolyrotaxane to be obtained of smaller than 1 μm may cause the powdery pseudopolyrotaxane to be blown together with the gas, decreasing the drying yield. A volume average particle size of a powdery pseudopolyrotaxane to be obtained of more than 300 μm may cause the particles to adhere to the inside of the dryer.

The water content of a powdery pseudopolyrotaxane obtained by the method for producing a pseudopolyrotaxane of the present invention is preferably 10% by weight or lower, more preferably 7% by weight or lower, and still more preferably 5% by weight or lower. A water content of a powdery pseudopolyrotaxane of more than 10% by weight increases the moisture amount in the reaction system where a capping group is introduced at each end of the pseudopolyrotaxane for preventing the release of cyclodextrin molecules. This may prevent proceeding of the reaction or decrease the introduction ratio of the capping groups.

Advantageous Effects of Invention

The present invention can provide a method for producing a pseudopolyrotaxane which includes an industrially advantageous method of producing a powdery pseudopolyrotaxane with a high inclusion ratio.

DESCRIPTION OF EMBODIMENTS

The present invention is described below in more detail based on examples which, however, are not intended to limit the scope of the present invention. In the following, a PEG having a carboxyl group at each end of the linear molecule was produced by oxidation of a PEG in accordance with the method described in WO 05/052026 A.

PRODUCTION EXAMPLE 1

In a 1-L flask, 100 g of a PEG (weight average molecular weight: 35,000), 1 g of TEMPO (2,2,6,6-tetramethyl-1-piperidinyloxy radical), and 10 g of sodium bromide were dissolved in 1 L of water. To the solution was added 50 mL of an aqueous solution of sodium hypochlorite (effective chlorine concentration: 5%), and the resulting mixture was stirred at room temperature for 30 minutes. An amount of 50 mL of ethanol was added to decompose the excess of sodium hypochlorite and terminate the reaction.

An organic layer was isolated by repeating extraction with 500 mL of methylene chloride three times using a separating funnel, and the methylene chloride was distilled off using an evaporator. The resulting substance was dissolved in 2 L of warm ethanol, and the solution was allowed to stand in a freezer (−4° C.) overnight, so that only a PEG having a carboxyl group at each end of the linear molecule was precipitated. The PEG was collected and dried under reduced pressure. Thereby, 100 g of a PEG having a carboxyl group at each end of the linear molecule was obtained.

PRODUCTION EXAMPLE 2

In a 1-L flask, 100 g of a high-molecular-weight PEG (weight average molecular weight: 100,000), 1 g of TEMPO (2,2,6,6-tetramethyl-l-piperidinyloxy radical), and 10 g of sodium bromide were dissolved in 1 L of water. To the solution was added 50 mL of an aqueous solution of sodium hypochlorite (effective chlorine concentration: 5%), and the resulting mixture was stirred at room temperature for 30 minutes. An amount of 50 mL of ethanol was added to decompose the excess of sodium hypochlorite and terminate the reaction.

An organic layer was isolated by repeating extraction with 500 mL of methylene chloride three times using a separating funnel, and the methylene chloride was distilled off using an evaporator. The resulting substance was dissolved in 2 L of warm ethanol, and the solution was allowed to stand in a freezer (−4° C.) overnight, so that only a PEG having a carboxyl group at each end of the linear molecule was precipitated. The PEG was collected and dried under reduced pressure. Thereby, 100 g of a PEG having a carboxyl group at each end of the linear molecule was obtained.

EXAMPLE 1

(1) Preparation of Aqueous Dispersion of Pseudopolyrotaxane from α-Cyclodextrin and a PEG Having Carboxyl Group at Each End of the Linear Molecule A 1-L flask with a stirrer was charged with 650 mL of water, 20 g of the PEG having a carboxyl group at each end of the linear molecule prepared in Production Example 1, and 80 g of α-cyclodextrin, and the mixture was heated to 70° C. to dissolve the substances.

The solution was cooled to 5° C. at a cooling speed of 0.4° C./min while being stirred by a stirring blade at a rotational speed of 700 rpm, and further stirred at the same temperature for 10 hours. Thereby, a milky aqueous dispersion of pseudopolyrotaxane having favorable fluidity (solids concentration: 13% by weight) was obtained. Measurement using a laser diffraction particle size analyzer showed that the particles in the aqueous dispersion of pseudopolyrotaxane had a volume average particle size of 10 μm.

(2) Drying of Aqueous Dispersion of Pseudopolyrotaxane

Using a nozzle atomizer spray drier (product of Ohkawara Kakohki Co., Ltd., "L-8"), 750 g of the prepared aqueous dispersion of pseudopolyrotaxane was dried (residence time: 1 minute) at a dryer gas inlet temperature of 160° C. and an outlet temperature of 70° C. under ordinary pressure. Thereby, 93 g of a powdery pseudopolyrotaxane was obtained. The obtained powdery pseudopolyrotaxane had a water content of 2.2% by weight and a volume average particle size of 35 μm.

EXAMPLE 2

A powdery pseudopolyrotaxane was obtained in the same manner as in Example 1 except that, in the preparation of the aqueous dispersion of pseudopolyrotaxane, the amount of the water for dissolving was 500 mL (solids concentration of the aqueous dispersion of pseudopolyrotaxane: 17% by weight). The prepared aqueous dispersion of pseudopolyrotaxane was in a milky form with fluidity and had a median particle size of 18 μm. The obtained powdery pseudopolyrotaxane had a water content of 1.4% by weight and a volume average particle size of 46 μm.

EXAMPLE 3

A powdery pseudopolyrotaxane was obtained in the same manner as in Example 1 except that, in the drying of the aqueous dispersion of pseudopolyrotaxane, the gas-stream inlet temperature of the dryer was 188° C., the outlet temperature was 90° C., and the residence time was 20 seconds. The obtained powdery pseudopolyrotaxane had a water content of 0.9% by weight and a volume average particle size of 28 μm.

EXAMPLE 4

A powdery pseudopolyrotaxane was obtained in the same manner as in Example 1 except that, in the drying of the aqueous dispersion of pseudopolyrotaxane, the gas-stream inlet temperature in the dryer was 120° C., the outlet temperature was 70° C., and the residence time was 1 min. The obtained powdery pseudopolyrotaxane had a water content of 4.8% by weight and a volume average particle size of 32 μm.

EXAMPLE 5

A powdery pseudopolyrotaxane was obtained in the same manner as in Example 1 except that, in the preparation of the aqueous dispersion of pseudopolyrotaxane, the cooling speed was 0.05° C./min, and in the drying of the aqueous dispersion of pseudopolyrotaxane, the gas-stream inlet temperature in the dryer was 170° C. and the outlet temperature was 80° C. The prepared aqueous dispersion of pseudopolyrotaxane was in a milky form with fluidity and had a median particle size of 5 μm.

The obtained powdery pseudopolyrotaxane had a water content of 1.7% by weight and a volume average particle size of 40 μm.

EXAMPLE 6

A powdery pseudopolyrotaxane was obtained in the same manner as in Example 1 except that, in the preparation of the aqueous dispersion of pseudopolyrotaxane, the stirring speed of the stirring blade was 600 rpm and the cooling speed was 10° C./min. The prepared aqueous dispersion of pseudopolyrotaxane was in a milky form with slight fluidity, and had a median particle size of 38 μm. The obtained powdery pseudopolyrotaxane had a water content of 2.1% by weight and a volume average particle size of 35 μm.

EXAMPLE 7

A powdery pseudopolyrotaxane was obtained in the same manner as in Example 1 except that, in the preparation of the aqueous dispersion of pseudopolyrotaxane, the stirring speed of the stirring blade was 75 rpm and the cooling speed was 0.1° C./min. The prepared aqueous dispersion of pseudopolyrotaxane was in a milky form with good fluidity and had a median particle size of 50 μm. The obtained powdery pseudopolyrotaxane had a water content of 1.9% by weight and a volume average particle size of 33 μm.

EXAMPLE 8

A powdery pseudopolyrotaxane was obtained in the same manner as in Example 2 except that, in the preparation of the aqueous dispersion of pseudopolyrotaxane, the stirring speed of the stirring blade was 7,000 rpm and the cooling speed was 20° C./min. The prepared aqueous dispersion of pseudopolyrotaxane was in a milky form with slight fluidity and had a median particle size of 2 μm. The obtained powdery pseudopolyrotaxane had a water content of 1.3% by weight and a volume average particle size of 9 μm.

EXAMPLE 9

An aqueous dispersion of pseudopolyrotaxane was obtained in the same manner as in Example 1 except that, in the preparation of the aqueous dispersion of pseudopolyrotaxane, the prepared mixture was cooled by allowing it to stand without stirring. Since the prepared aqueous dispersion of pseudopolyrotaxane was in a paste form with little fluidity, the dispersion was diluted with 150 g of water (solids concentration of the aqueous dispersion of pseudopolyrotaxane: 11% by weight) and stirred with a spatula to give fluidity. The resultant dispersion was dried in the same manner as in Example 1, thereby yielding a powdery pseudopolyrotaxane. The obtained powdery pseudopolyrotaxane had a water content of 3.6% by weight and a volume average particle size of 11 μm.

EXAMPLE 10

A powdery pseudopolyrotaxane was obtained in the same manner as in Example 1 except that the PEG having a carboxyl group at each end prepared in Production Example 2 was used. The prepared aqueous dispersion of pseudopolyrotaxane was in a milky form with slight fluidity and had a median particle size of 15 The obtained powdery pseudopolyrotaxane had a water content of 1.6% by weight and a volume average particle size of 33 μm.

EXAMPLE 11

An aqueous dispersion of pseudopolyrotaxane was obtained in the same manner as in Example 10 except that, in the preparation of the aqueous dispersion of pseudopolyrotaxane, the prepared mixture was cooled by allowing it to stand without stirring. Since the prepared aqueous dispersion of pseudopolyrotaxane had no fluidity, the dispersion was diluted with 250 g of water (the solids concentration of the aqueous dispersion of pseudopolyrotaxane: 10% by weight) and stirred with a spatula to give slight fluidity. The resultant dispersion was dried in the same manner as in Example 1, thereby yielding a powdery pseudopolyrotaxane. The obtained powdery pseudopolyrotaxane had a water content of 3.5% by weight and a volume average particle size of 14 μm.

COMPARATIVE EXAMPLE 1

A pseudopolyrotaxane was obtained in the same manner as in Example 1 except that the aqueous dispersion of pseudopolyrotaxane was freeze dried (dried at −10 to 20° C. for 48 hours). The obtained pseudopolyrotaxane was in the form of porous agglomerates with a water content of 1.2% by weight.

COMPARATIVE EXAMPLE 2

A pseudopolyrotaxane was obtained in the same manner as in Example 1 except that the aqueous dispersion of pseudopolyrotaxane was dried under reduced pressure at 20° C. for 96 hours. The obtained pseudopolyrotaxane was in the form of a hard agglomerate with a water content of 4.0% by weight.

<Evaluation>

The inclusion ratio was measured on each pseudopolyrotaxane obtained in the examples and comparative examples by the following method. Table 1 shows the results.

(1) Capping of Pseudopolyrotaxane Using Adamantane Amine and BOP Reagent Reaction System In a 1-L flask, 0.5 g of an adamantane amine was dissolved in 170 mL of dimethyl formamide (DMF) at room temperature. Then, 50 g of the obtained pseudopolyrotaxane was added to the flask and the mixture was promptly shaken well.

Subsequently, a solution in which 1.3 g of a BOP reagent (benzotriazol-1-yl-oxy-tris(dimethylamino)phosphonium hexafluorophosphate) was dissolved in 80 mL of DMF was added to the flask, and the mixture was promptly shaken well.

Furthermore, to the flask was added a solution in which 0.50 mL of diisopropylethylamine was dissolved in 80 mL of DMF, and the mixture was promptly shaken well. The resultant mixture was allowed to stand in a refrigerator overnight.

(2) Purification of Polyrotaxane and Measurement of Inclusion Ratio

The obtained mixture was subjected to a cleaning operation in which 300 mL of DMF was added to the flask and the mixture was mixed well and centrifuged, and then the supernatant was discarded. The cleaning operation using DMF was repeated twice in total to obtain a precipitate. The obtained precipitate was subjected to a cleaning operation in which the precipitate was dispersed in 2,000 mL of hot water (70° C.) and the mixture was well stirred and then filtered.

The cleaning operation with hot water was repeated four times in total. The obtained precipitate was freeze dried, thereby finally yielding a purified polyrotaxane.

The inclusion ratio of the obtained polyrotaxane was determined by $^1$H-NMR. The obtained inclusion ratio can be regarded as the inclusion ratio of the pseudopolyrotaxane.

TABLE 1

|  | Inclusion ratio |
|---|---|
| Example 1 | 0.27 |
| Example 2 | 0.27 |
| Example 3 | 0.28 |
| Example 4 | 0.29 |
| Example 5 | 0.27 |
| Example 6 | 0.25 |
| Example 7 | 0.28 |
| Example 8 | 0.24 |
| Example 9 | 0.25 |
| Example 10 | 0.22 |
| Example 11 | 0.21 |
| Comparative Example 1 | 0.19 |
| Comparative Example 2 | 0.18 |

INDUSTRIAL APPLICABILITY

The present invention can provide a method for producing a pseudopolyrotaxane which includes an industrially advantageous method of producing a powdery pseudopolyrotaxane with a high inclusion ratio.

The invention claimed is:

1. A method for producing a pseudopolyrotaxane, comprising:
   an inclusion step of mixing polyethylene glycol and cyclodextrin in an aqueous medium so as to form an aqueous dispersion of pseudopolyrotaxane, which comprises pseudopolyrotaxane particles in which the polyethylene glycol is included in cavities of molecules of the cyclodextrin in a skewered manner; and
   a drying step of drying the aqueous dispersion of the pseudopolyrotaxane produced in the inclusion step so as to obtain the pseudopolyrotaxane in a dry form,
   wherein, in the inclusion step, the polyethylene glycol and the cyclodextrin are dissolved in the aqueous medium so as to form a mixed solution, and the mixed solution is continuously or intermittently cooled at a cooling speed in a range from 0.05 to 30° C./min. while the mixed solution flows without being left to stand by stirring at a rotational speed between 75 and 7000 rpm, so that the pseudopolyrotaxane particles form, and thereby the aqueous dispersion of the pseudopolyrotaxane is produced, and
   wherein a weight ratio between the polyethylene glycol and the cyclodextrin is in a range from 1:3 to 1:5,
   wherein the pseudopolyrotaxane particles in the aqueous dispersion of the pseudopolyrotaxane have a volume average particle size in a range from 1 to 50 μm, and
   wherein, in the drying step, the aqueous dispersion of the pseudopolyrotaxane is sprayed by a nozzle method and dried in a heated gas-stream.

2. The method for producing the pseudopolyrotaxane according to claim 1,
   wherein the polyethylene glycol has a weight average molecular weight in a range from 1,000 to 500,000.

3. The method for producing the pseudopolyrotaxane according to claim 1,
   wherein a solid concentration of the aqueous dispersion of pseudopolyrotaxane is in a range from 5 to 25% by weight.

4. The method for producing the pseudopolyrotaxane according to claim 1,
   wherein a gas-stream temperature in the drying step is in a range from 70 to 200° C.

5. The method for producing the pseudopolyrotaxane according to claim 1,
   wherein pressure in a system in the drying step is equal to or lower than the atmospheric pressure.

6. The method for producing the pseudopolyrotaxane according to claim 1,
   wherein the flowing of the mixed solution is performed by flowing continuously the mixed solution by at least one method selected from the group consisting of stirring with a blade and homogenizing.

7. The method for producing the pseudopolyrotaxane according to claim 1,
   wherein the drying step is carried out in a spray dryer with an inlet temperature between 120 and 188° C. and an outlet temperature between 70 and 90° C.

* * * * *